(12) United States Patent
Fellinger et al.

(10) Patent No.: US 12,054,298 B2
(45) Date of Patent: Aug. 6, 2024

(54) PIPE COMPRESSION EQUIPMENT

(71) Applicant: JOHNS MANVILLE, Denver, CO (US)

(72) Inventors: Thomas John Fellinger, Littleton, CO (US); Josh Freeman, Littleton, CO (US); Jayamalar Dorsey, Highlands Ranch, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 17/872,671

(22) Filed: Jul. 25, 2022

(65) Prior Publication Data

US 2022/0363419 A1  Nov. 17, 2022

Related U.S. Application Data

(62) Division of application No. 16/773,579, filed on Jan. 27, 2020, now Pat. No. 11,427,358.

(51) Int. Cl.
| | |
|---|---|
| *B65B 13/20* | (2006.01) |
| *B25J 5/00* | (2006.01) |
| *B25J 9/10* | (2006.01) |
| *B65B 35/52* | (2006.01) |
| *F16L 59/02* | (2006.01) |
| *F16L 59/14* | (2006.01) |

(52) U.S. Cl.
CPC ............. *B65B 13/20* (2013.01); *B65B 35/52* (2013.01); *F16L 59/021* (2013.01); *F16L 59/14* (2013.01); *B25J 5/007* (2013.01); *B25J 9/10* (2013.01)

(58) Field of Classification Search
CPC .......... B65B 13/20; B65B 35/52; B25J 5/007; B25J 9/10; F16L 59/14; F16L 59/021; G01N 2203/0254
See application file for complete search history.

(56) References Cited

U.S. PATENT DOCUMENTS

| | | |
|---|---|---|
| 3,964,232 A | 6/1976 | Bender et al. |
| 4,676,153 A | 6/1987 | Ast |
| 5,014,495 A | 5/1991 | Bolejack et al. |

(Continued)

FOREIGN PATENT DOCUMENTS

| | | |
|---|---|---|
| CN | 105836234 A | 8/2016 |
| CN | 109204909 A | 1/2019 |

(Continued)

*Primary Examiner* — Anne Marie Antonucci
*Assistant Examiner* — Luis G Del Valle
(74) *Attorney, Agent, or Firm* — Robert D. Touslee

(57) ABSTRACT

A system for compressing and packing pipe insulation includes a compression member that is movable along a first axis to compress pieces of pipe insulation. A stacking bay includes opposing walls that are spaced apart from one another. At least one of the two opposing walls is movable relative to the other of the two opposing walls along a second axis to adjust a lateral distance between the opposing walls to accommodate an increasing size of the pieces of pipe insulation along the second axis. The first axis is generally orthogonal to the second axis. A packing member that applies a force along a third axis to the pieces of pipe insulation after being compressed. The third axis is generally orthogonal to the first and second axes. The first axis is generally orthogonal to the second axis. The compression member is aligned with a space formed between the opposing walls.

19 Claims, 9 Drawing Sheets

(56) References Cited

U.S. PATENT DOCUMENTS

| | | | |
|---|---|---|---|
| 5,056,428 A * | 10/1991 | Allen | B30B 9/3028 |
| | | | 100/220 |
| 5,666,786 A | 9/1997 | Focke et al. | |
| 5,687,643 A | 11/1997 | Felts et al. | |
| 5,694,742 A | 12/1997 | Elliott et al. | |
| 5,981,024 A | 11/1999 | Noergaard et al. | |
| 6,823,776 B1 | 11/2004 | Olds | |
| 11,427,358 B2 | 8/2022 | Fellinger et al. | |
| 2002/0073655 A1* | 6/2002 | Gamberini | B65B 63/02 |
| | | | 53/529 |
| 2008/0245690 A1 | 10/2008 | Knewtson | |
| 2011/0011035 A1* | 1/2011 | Praestholm | B65B 39/02 |
| | | | 53/529 |
| 2014/0026767 A1 | 1/2014 | Theodoroff et al. | |
| 2015/0329230 A1 | 11/2015 | Rasi | |
| 2017/0073097 A1 | 3/2017 | Iwasa et al. | |

FOREIGN PATENT DOCUMENTS

| | | | |
|---|---|---|---|
| EP | 0 679 579 B1 | 9/1997 | |
| EP | 2237946 B1 * | 3/2012 | B30B 9/3014 |

* cited by examiner

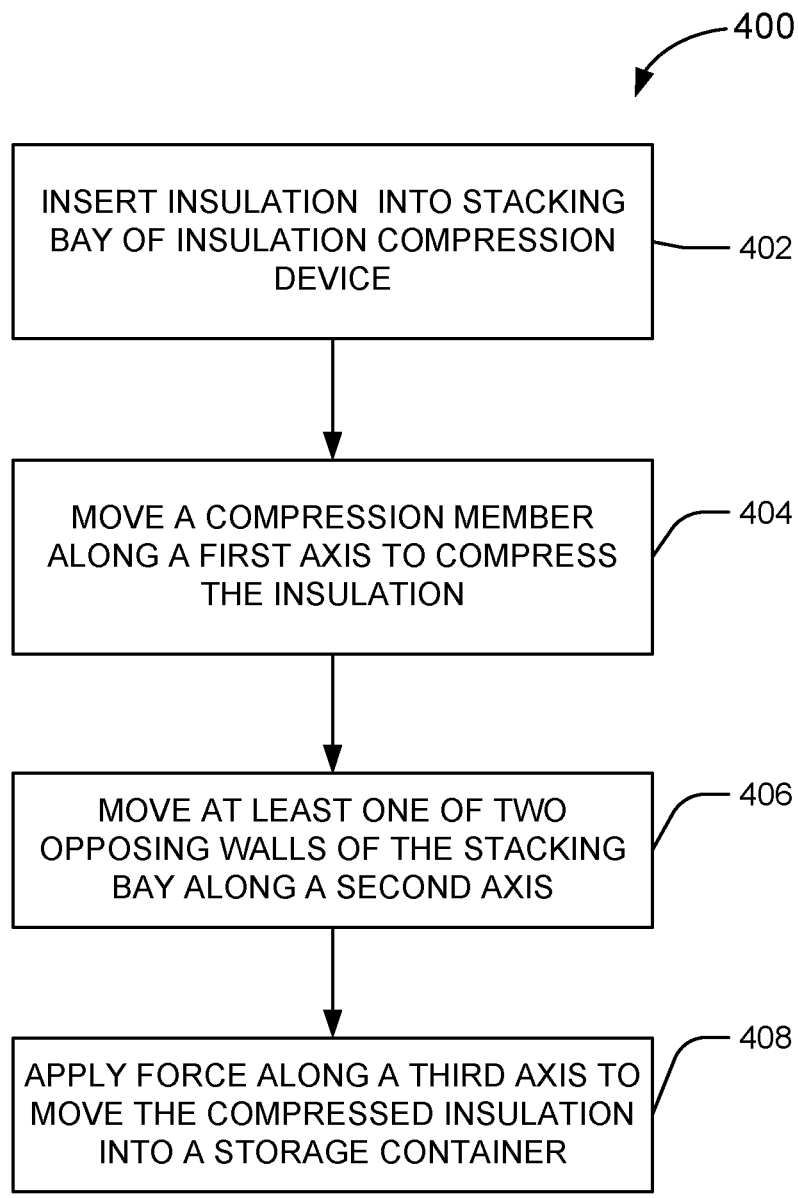

PIPE COMPRESSION EQUIPMENT

CROSS-REFERENCE TO RELATED APPLICATIONS

This application is a division of pending U.S. application Ser. No. 16/773,579 filed Jan. 27, 2020. The entire contents of the above-identified application are herein incorporated by reference for all purposes.

BACKGROUND OF THE INVENTION

Existing compression and packing processes for pipe insulation typically utilize vacuum packaging techniques. For example, sections of insulation may be interleafed and then inserted into a plastic bag. A vacuum hose or other device is then used to remove air from the bag until the insulation material is compressed enough to allow a sleeve to be slid over the compressed insulation. Oftentimes, such techniques result in bundles of insulation that are not uniform in shape or size. Additionally, the compressed pipe insulation is often damaged due to the extreme of vacuum applied to the insulation material. The lack of uniformity of the packages of compressed pipe insulation also makes loading the packages onto shipping vehicles difficult and inefficient, as the various shapes and sizes of packages may be difficult to stack and/or otherwise arrange.

BRIEF SUMMARY OF THE INVENTION

Embodiments of the present invention are directed to pipe insulation, as well as systems and methods for compressing and packaging such pipe insulation in a more efficient and uniform manner that results in reductions in damage to the packed pipe insulation products. More specifically, embodiments utilize insulation packaging equipment that allows stacked insulation sections to be compressed and packed into uniform bundles with less product damage and with improved truck loading efficiency. For example, embodiments include a pipe insulation compression device that includes moving walls that allow pipe insulation to be compressed and inserted into bags without interleaving the pipe insulation pieces and without the use of vacuum packing techniques, thereby eliminating many of the problems associated with conventional pipe insulation packaging techniques. Additionally, by adding external longitudinal slits to sections of the insulation, round insulation sections can be compressed into flattened shapes to minimize the air space within the insulation.

In one embodiment, a system for compressing and packing pipe insulation is provided. The system may include a compression member that may be movable along a first axis to compress a plurality of pieces of pipe insulation and a stacking bay that includes two opposing walls that are spaced apart from one another. At least one of the two opposing walls may be movable relative to the other of the two opposing walls along a second axis to adjust a lateral distance between the two opposing walls to accommodate an increasing size of the plurality of pieces of pipe insulation along the second axis while being compressed by the compression member. The first axis may be generally orthogonal to the second axis. The system may also include a packing member that may be configured to apply a force along a third axis to the plurality of pieces of pipe insulation after being compressed. The third axis may be generally orthogonal to the first axis and the second axis. The compression member may be aligned with a space formed between the two opposing walls.

In some embodiments, the system may further include a container interface having an attachment point that may be configured to couple with a storage container. The packing member may be configured to force the plurality of pieces of pipe insulation through the container interface and into the storage container. In some embodiments the attachment point is adjustable so as to accommodate different sizes of storage containers. In some embodiments, the storage container may include one or both of a sleeve or bag. In some embodiments, the at least one of the two opposing walls may be spring biased toward the other of the two opposing walls with a spring force that allows the lateral distance to increase as compressed insulation expands along the second axis. In some embodiments, the at least one of the two opposing walls may be configured to move along the second axis at a predetermined rate relative to movement of the compression member. In some embodiments, both of the two opposing walls may be movable along the second axis.

In another embodiment, a system for compressing and packing pipe insulation may include a compression member that is movable along a first axis and a stacking bay that includes two opposing walls that are spaced apart from one another. At least one of the two opposing walls may be movable relative to the other of the two opposing walls along a second axis to adjust a lateral distance between the two opposing walls. The first axis may be generally orthogonal to the second axis. The compression member may be aligned with a space formed between the two opposing walls. The at least one of the two opposing walls may be configured to increase the lateral distance between the two opposing walls as the compression member moves toward the space formed between the two opposing walls.

In some embodiments, the system may include a container interface having an attachment point for a storage container. The container interface may be positioned on a side of the stacking bay that is generally orthogonal to both the first axis and the second axis. In some embodiments, the attachment point may be adjustable in size so as to accommodate a plurality of sizes of storage containers. In some embodiments, the compression member may include a movable ram. In some embodiments, at least one of the two opposing walls may be spring biased toward the other of the two opposing walls with a spring force that allows the lateral distance to increase as compressed insulation expands along the second axis. In some embodiments, the system may also include a packing member that may be configured to apply a force to compressed pipe insulation along a third axis that may be generally orthogonal to the first axis and the second axis such that the compressed pipe insulation is passed through the container interface and into the storage container.

In another embodiment, a method for compressing and packing pipe insulation is provided. The method may include inserting a plurality of pieces of pipe insulation into a stacking bay of an insulation compression device and moving a compression member along a first axis into an interior of the stacking bay to compress the plurality of pieces of pipe insulation. The method may also include moving at least one of two opposing walls of the stacking bay along a second axis to increase a lateral distance between the two opposing walls while the compression member is moved to accommodate an increasing size of the plurality of pieces of pipe insulation along the second axis. The first axis may be generally orthogonal to the second axis.

In some embodiments, each of the plurality of pieces of pipe insulation may include a length extending along a longitudinal axis, a thickness, and a through cut extending entirely through the thickness along an entirety of the length. Each of the plurality of pieces of pipe insulation may also include a first cut, a second cut, and a third cut formed through a portion of the thickness and spaced at approximately 90 degree increments about the longitudinal axis relative to the through cut. In some embodiments, inserting the plurality of pieces of pipe insulation include arranging each of the plurality of pieces of pipe insulation such that the through cut is substantially aligned with the first axis. The second cut may be spaced approximately 180 degrees apart from the through cut about the longitudinal axis and may be formed through an interior surface of the respective piece of pipe insulation. The first cut and the third cut may be formed on opposite sides of the respective piece of pipe insulation and are spaced approximately 90 degrees apart from the through cut about the longitudinal axis. The first cut and the third cut may be formed through an exterior surface of the respective piece of pipe insulation.

In some embodiments. when compressed the each of the plurality of pieces of pipe insulation may include a generally figure 8 shaped cross section. In some embodiments, the method may also include applying a force along a third axis to move compressed pipe insulation into a storage container. The third axis may be substantially orthogonal to the first axis and the second axis. In some embodiments, the method may further include affixing the storage container to an attachment point of the insulation compression device. In some embodiments, the method may also include adjusting a size of the attachment point to accommodate a size of the storage container.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a set of parentheses containing a second label that distinguishes among the similar components. If only the first reference label is used in the specification, the description is applicable to any one of the similar components having the same first reference label irrespective of the second reference label.

FIG. 4 is a flowchart depicting a process for compressing and packing pipe insulation according to embodiments of the invention.

DETAILED DESCRIPTION OF THE INVENTION

Figure 1A:
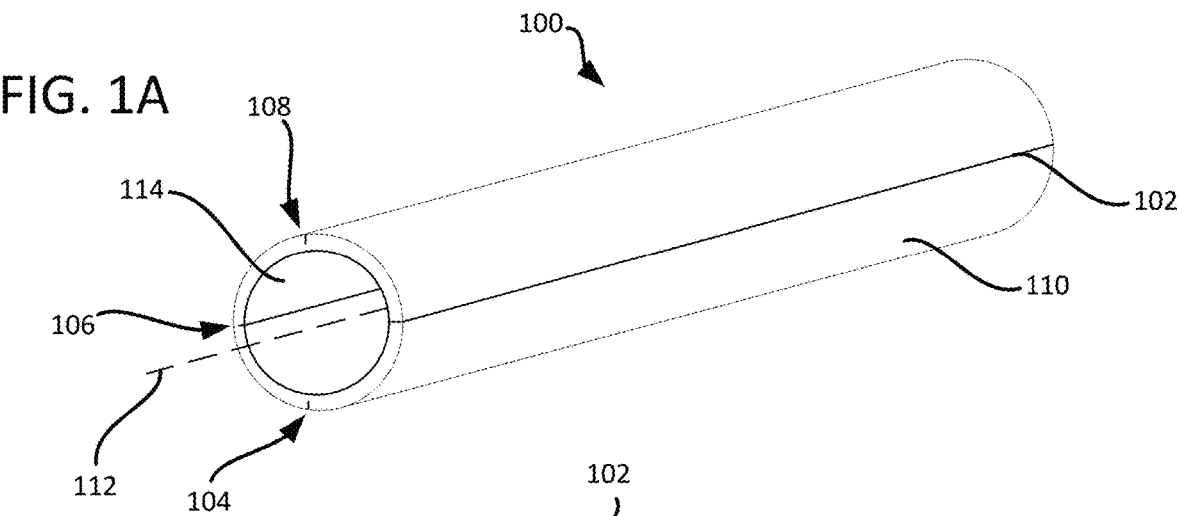
FIG. 1A depicts an isometric view of pipe insulation according to embodiments of the invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the present invention are directed to systems and methods of compressing and packaging pipe insulation. Embodiments provide solutions that enable pipe insulation to be packaged in manner that results in consistent and efficient sizes and shapes for shipment and/or storage without resulting in damage to the pipe insulation. Embodiments achieve such results by utilizing a compression member that compresses a number of pieces of stacked (or otherwise arranged pipe insulation) along a first axis in conjunction with a stacking bay that has expandable or otherwise movable opposing walls that move outward along a second axis (generally perpendicular to the first axis) to accommodate an expanding size of the pipe insulation as the pipe insulation is being compressed along the first axis. This allows several pieces of pipe insulation to be stacked and compressed without the pipe insulation rolling or otherwise moving during the compression phase and ensures that the compressed pipe insulation is compressed in a repeatable and uniform manner. While discussed primarily in relation to pipe insulation, it will be appreciated that the systems and methods described herein may be used in many other applications, including with other types of insulation, padding, and/or other generally tubular and/or resilient materials.

With proper construction of the packaging equipment and by keeping the 100% through cut of each insulation piece in the same orientation, several sections of externally-slit insulation can be compressed and bundled into generally rectangular packages with minimized product damage. The spring-loaded (or otherwise) moving opposing walls the device allow material to be stacked with sidewall pressure on the material. This keeps the sections of insulation from rolling around and helps to ensure the 100% through cut of each section remains in a downward orientation (or otherwise oriented with a direction of movement of the compression member). Stacked insulation can then be slowly compressed into generally flat shapes with the compression member. The moving opposing walls allow the material to fan out during the compression process. A packing member is then used to push and/or otherwise convey the compressed material in a bag or sleeve by applying force along an axis. If desired, the individual bundles can be stretch wrapped together or placed in a bag and/or other storage container to form a larger uniformly sized package.

Figure 1B:
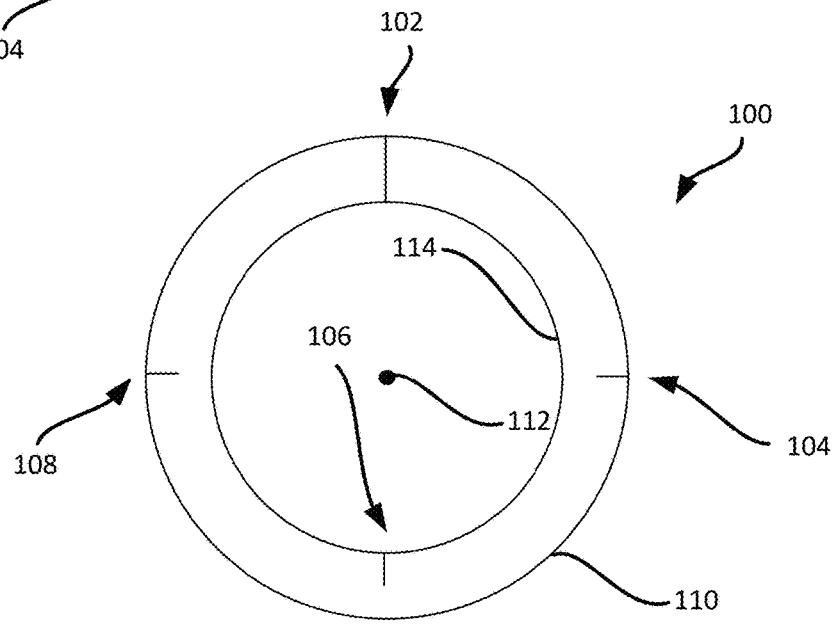
FIG. 1B depicts an end view of the pipe insulation of FIG. 1A in an uncompressed state.
Figure 1C:
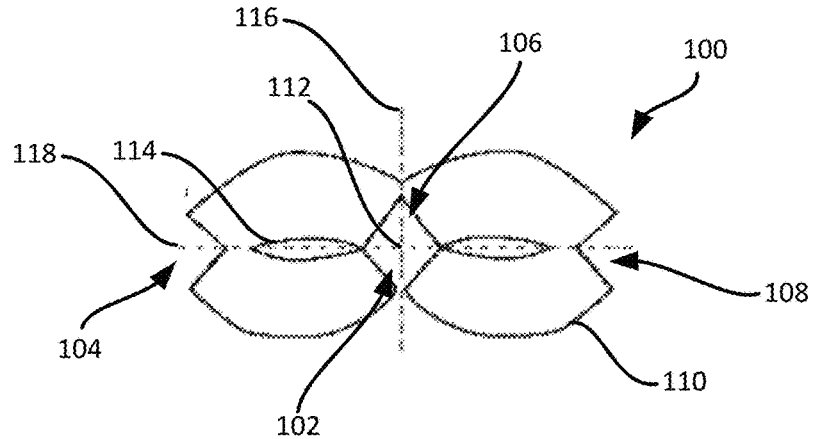
FIG. 1C depicts an end view of the pipe insulation of FIG. 1A in a compressed state.

Turning now to FIGS. 1A-1C, one embodiment of insulation 100 for compression and packaging in accordance with the present invention is illustrated. While used as pipe insulation, it will be appreciated that insulation 10 may also be used in other numerous insulation applications as well as non-insulation applications. Insulation 100 may include any number of layers of insulation product, membranes, jacketing, and/or other layers as desired for a particular application. As illustrated in FIG. 1A, in some embodiments insulation 100 may be an elongate member having a generally circular cross section. To allow the insulation 100 to be fitted about a pipe and/or other round structure, the insulation 100 may include a through cut 102 that extends along an entirety of a length L of the insulation 100. The through cut 102 extends entirely through a thickness T of the insulation 100 such that the insulation 100 is fully severed on one side. During installation of the insulation, opposing sides of the insulation at the through cut 102 may be grasped and forced apart from one another to widen a slit that may receive the pipe or other structure. Once in place, the opposing sides may be allowed to come together and/or are forced together to secure the pipe or other structure within the insulation 100.

Insulation 100 may include a number of additional cuts or slits that are formed in surfaces of the insulation 100 that allow the insulation 100 to be compressed in a uniform manner. For example, a first cut 104, a second cut 106, and a third cut 108 may be provided in various surfaces of the insulation 100. The first cut 104 and the third cut 108 may be exterior side cuts that are formed in an exterior surface 110 of the insulation 100. For example, as best illustrated in FIG. 1B the first cut 104 may be positioned approximately 90 degrees from the through cut 102 relative to a central longitudinal axis 112 of the insulation 100. The third cut 108 may then be positioned on an opposite side of the insulation 100 approximately 180 degrees from the first cut 104 relative to the longitudinal axis 112 and approximately 90 degrees from the through cut 102 relative to the longitudinal axis 112. Each of the first cut 104 and the third cut 108 may extend through about 30%-75% of the thickness T of the insulation 100 from the exterior surface 110. The second cut 106 may be an interior hinge cut that is formed through an interior surface 114 of the insulation 100. The second cut 106 may be positioned approximately 180 degrees from the through cut 102 relative to the longitudinal axis 112 and approximately 90 degrees from each of the first cut 104 and the third cut 108 relative to the longitudinal axis 112. The second cut 106 may extend through about 30%-75% of the thickness T of the insulation 100 from the interior surface 114.

The arrangement of cuts described above enables insulation 100 to be compressed into a generally figure 8 shape as best illustrated in FIG. 1C. For example, when compressed along an axis 116 that is in general alignment with the through cut 102, sections of insulation 100 proximate the through cut 102 and the second cut 106 may be moved toward one another to compress the insulation 100 along the axis 116. While being compressed along the axis 116, portions of the insulation 100 near the first cut 104 and the second cut 108 may be pushed away from another such that the insulation expands along a second axis 118 that is substantially parallel to axis 116. In this manner, the insulation 100 may be compressed into an elongate figure 8 shape.

The position and design of the various cuts further enables the insulation 100 to be compressed in the manner described above. For example, by forming the first cut 104 and the third cut 108 through the exterior surface 110, it allows exterior portions of the insulation 100 proximate each of the first cut 104 and the third cut 108 to be drawn away from one another such that the insulation can flex and compress along the axis 116. By forming the second cut 106 through the interior surface 114, the interior portions of insulation 100 proximate the second cut 106 to be separated to allow the insulation to expand along the second axis 118 while being compressed along axis 116.

Figure 2:
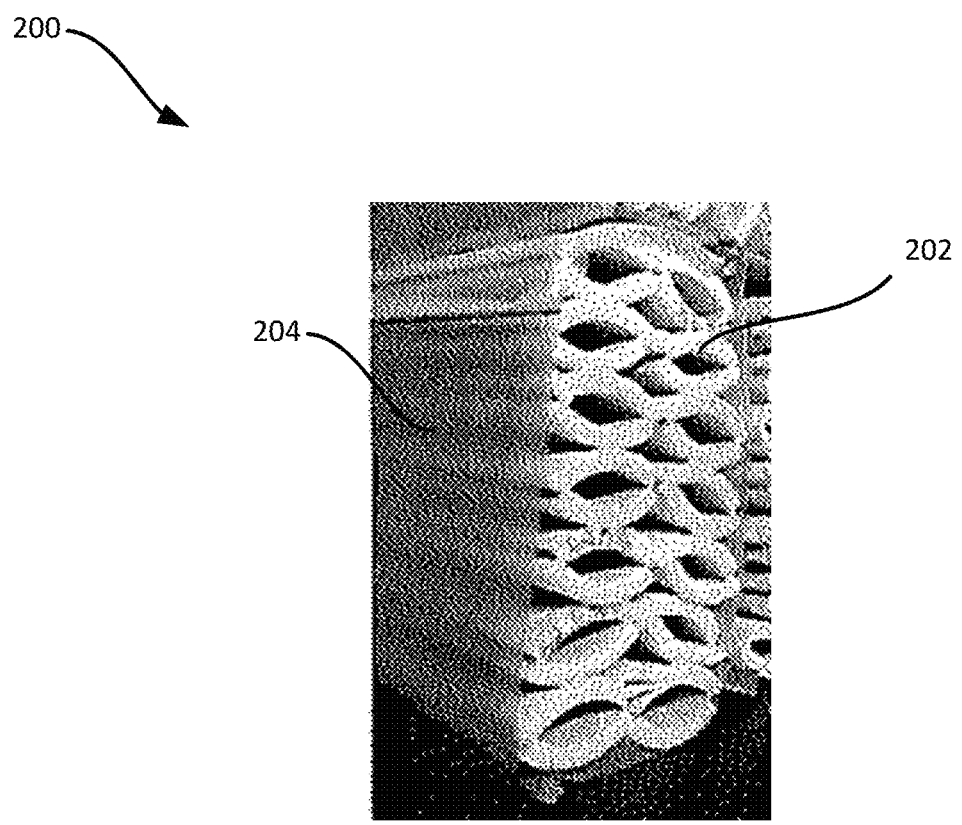
FIG. 2 depicts a package of compressed insulation pieces according to embodiments of the invention.

FIG. 2 illustrates a package 200 of compressed insulation pieces 202 according to one embodiment. Insulation pieces 202 may be similar to insulation 100 and may be compressed in a manner similar to that shown in FIG. 1C such that the individual insulation pieces 202 have generally figure-8 shaped cross-sections. Package 200 may include a number of compressed insulation pieces 202 that are stacked and/or otherwise arranged side-by-side with one another such that the through cuts of each of the insulation pieces 202 are aligned along an axis of the package 200. This allows the package 200 to be generally rectangular for easy stacking and arranging for storage and/or shipment. A bag or sleeve 204 may be positioned around the insulation pieces 202 to keep the insulation pieces 202 in the compressed/stacked configuration. While shown here with seven insulation pieces 202 in package 200, it will be appreciated that any number of insulation pieces 202 may be placed into a single package 200. Additionally, while shown with only one row of stacked insulation pieces 202, it will be appreciated that in some embodiments, multiple rows of stacked insulation pieces 202 may be arranged side-by-side to create larger packages 200 of insulation pieces 202.

FIGS. 3A-3F depict a device 300 for compressing and packaging insulation in accordance with the present invention. Device 300 may be configured to compress and pack generally circular insulation (such as pipe insulation) and/or other materials into a generally figure 8 shape such as described above in accordance with FIGS. 1A-1C. For example, device 300 may include a stacking bay 302 that provides a space for uncompressed insulation 304 to be arranged for subsequent compressing and packaging. The stacking bay 302 includes at least two opposing walls 306. While shown as side walls, it will be appreciated that in some embodiments opposing walls 306 may be top and bottom walls and/or in other arrangements. The opposing walls 306 may define limits of an interior space that that receives the uncompressed insulation 304.

One or both of the opposing walls 306 may be configured to move relative to the other one of the opposing walls 306 along an axis 308 so as to alter a distance between the opposing walls 306. For example, one or both of the opposing walls 306 may move to expand and contract the size of the interior space. The movement of the opposing walls 306 may be active or passive. For example, in some embodiments one or both of the opposing walls 306 may be spring biased toward the other of the opposing walls 306. The spring force of the spring(s) may be selected such that the lateral distance between the opposing walls 306 is able to increase to accommodate the increasing size of compressed insulation 304 along the axis 308. Other passive mechanisms, that can be set to provide a desired amount of force may be utilized as well.

In other embodiments, an active movement mechanism may be used to alter the distance between the opposing walls 306. For example, one or both of the opposing walls 306 may be coupled with a linear actuator that moves the respective opposing wall 306 at a predetermined rate. For example, the linear actuator may utilize a screw actuator (such as, but not limited to, a leadscrew, screw jack, ball screw and/or roller screw actuator) a wheel and axle actuator (such as, but not limited to a hoist, winch, rack and pinion, chain drive, belt drive, rigid chain and/or rigid belt actuator), a cam actuator, and/or combinations thereof to drive the motion of one or both of the opposing walls 306 at a controlled rate. The linear actuator may be purely mechanical, may be driven by hydraulic and/or pneumatic means, and/or be electrically driven. Oftentimes, a rate of movement of one or both of the opposing walls 306 may be set based on a rate of compression, size, and/or expected expansion rate and/or size of the insulation 304. For example, a particular size of insulation 304 may be compressed at a predetermined rate that causes the insulation to expand along axis 308 at a known rate. One or both of the opposing walls 306 may be moved at a rate that matches this expansion along axis 308 to ensure that the edges of insulation 304 remain in contact with the opposing walls 306 during the compression process.

In some embodiments, the opposing walls 306 may also include stops that set a maximum expansion distance of the opposing walls 306. These stops may be permanently fixed in place and/or may be adjustable to accommodate different sizes of insulation. In operation, the stops halt the expansion of the opposing walls 306 at a predetermined distance such that different batches of insulation 304 may be compressed to a uniform size so that packages of the insulation 304 are uniform for better efficiency for storage and/or shipping.

Figure 3A:
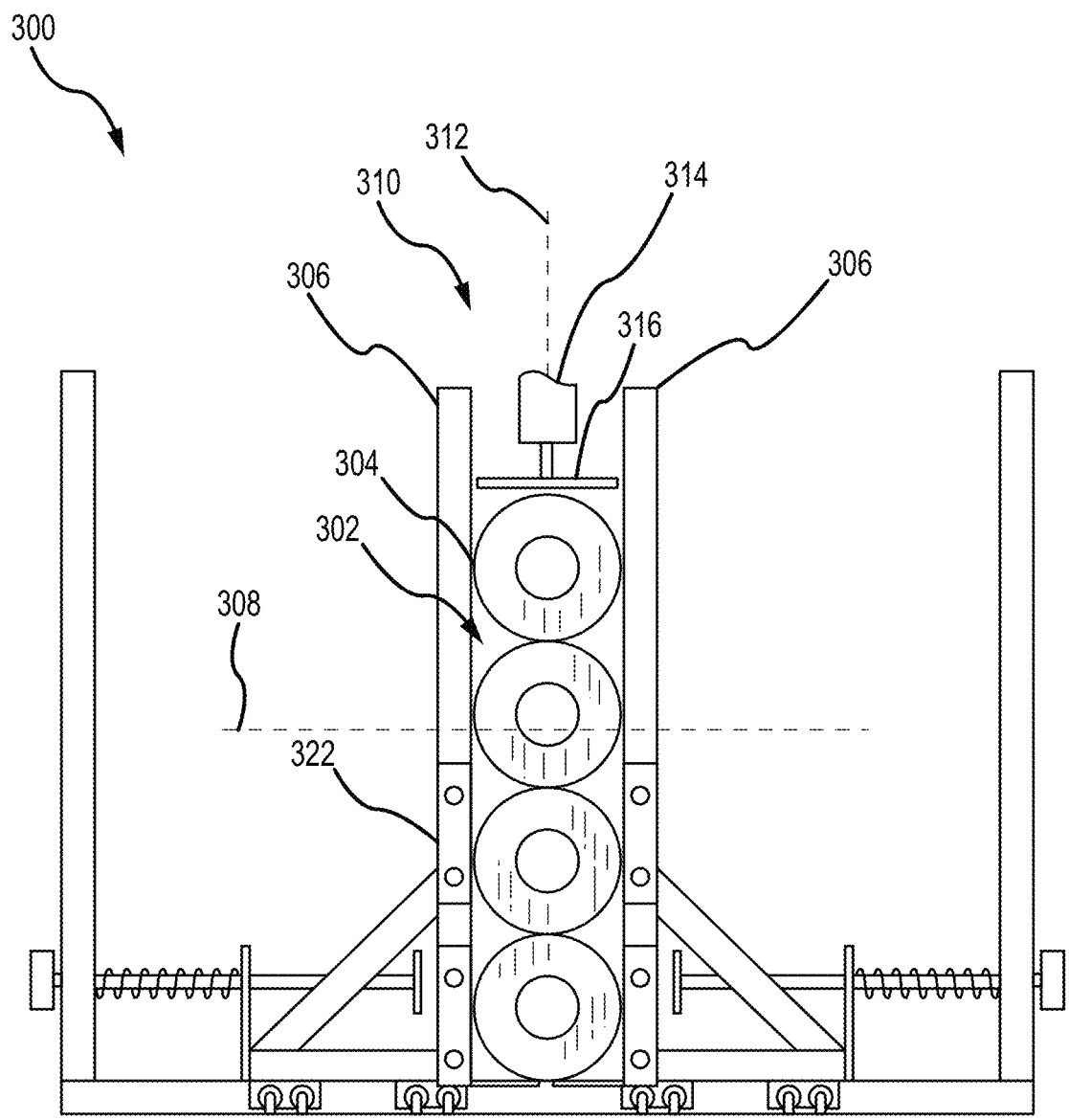
FIG. 3A illustrates a front view of insulation compression and packing equipment in an uncompressed state according to embodiments.
Figure 3B:
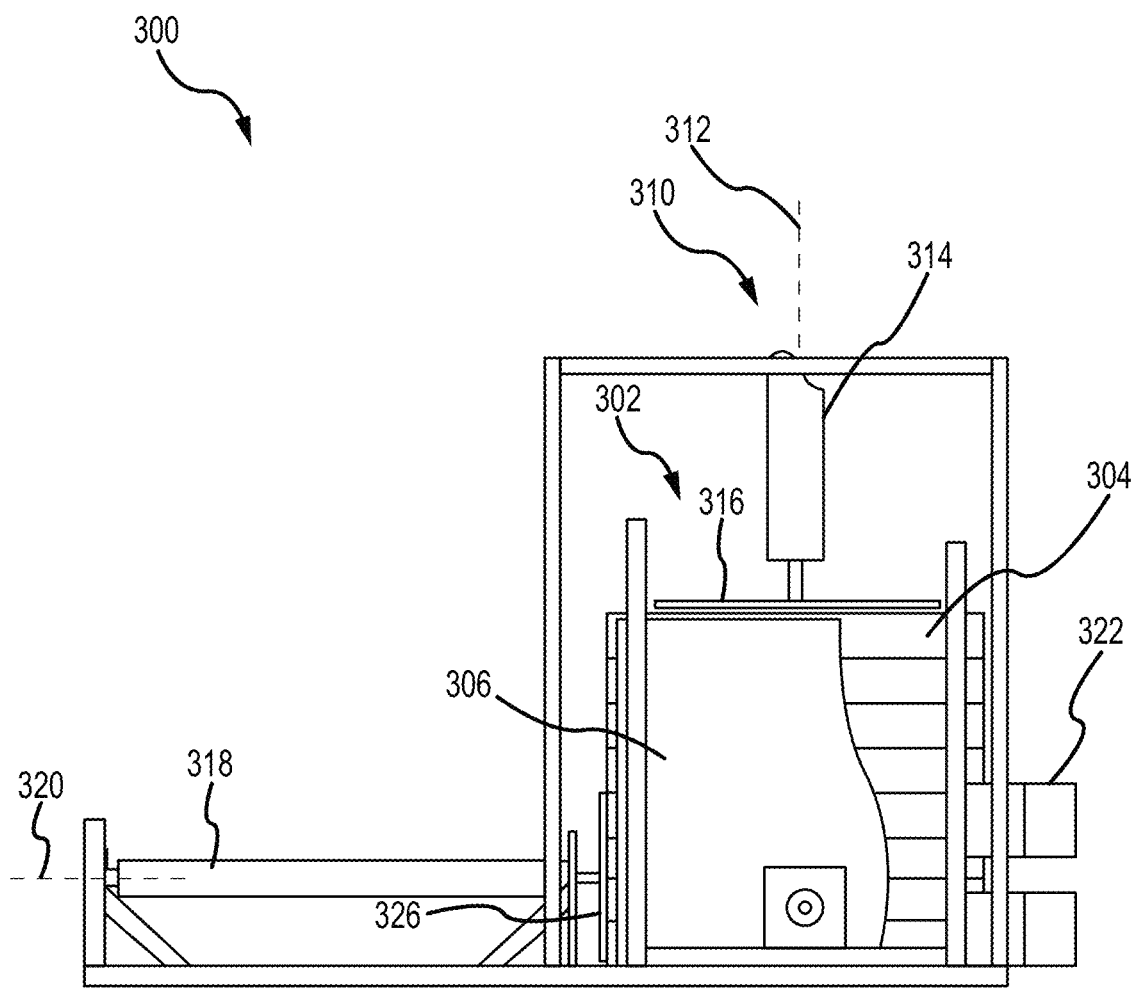
FIG. 3B illustrates a side view of the insulation compression and packing equipment of FIG. 3A in an uncompressed state.
Figure 3C:
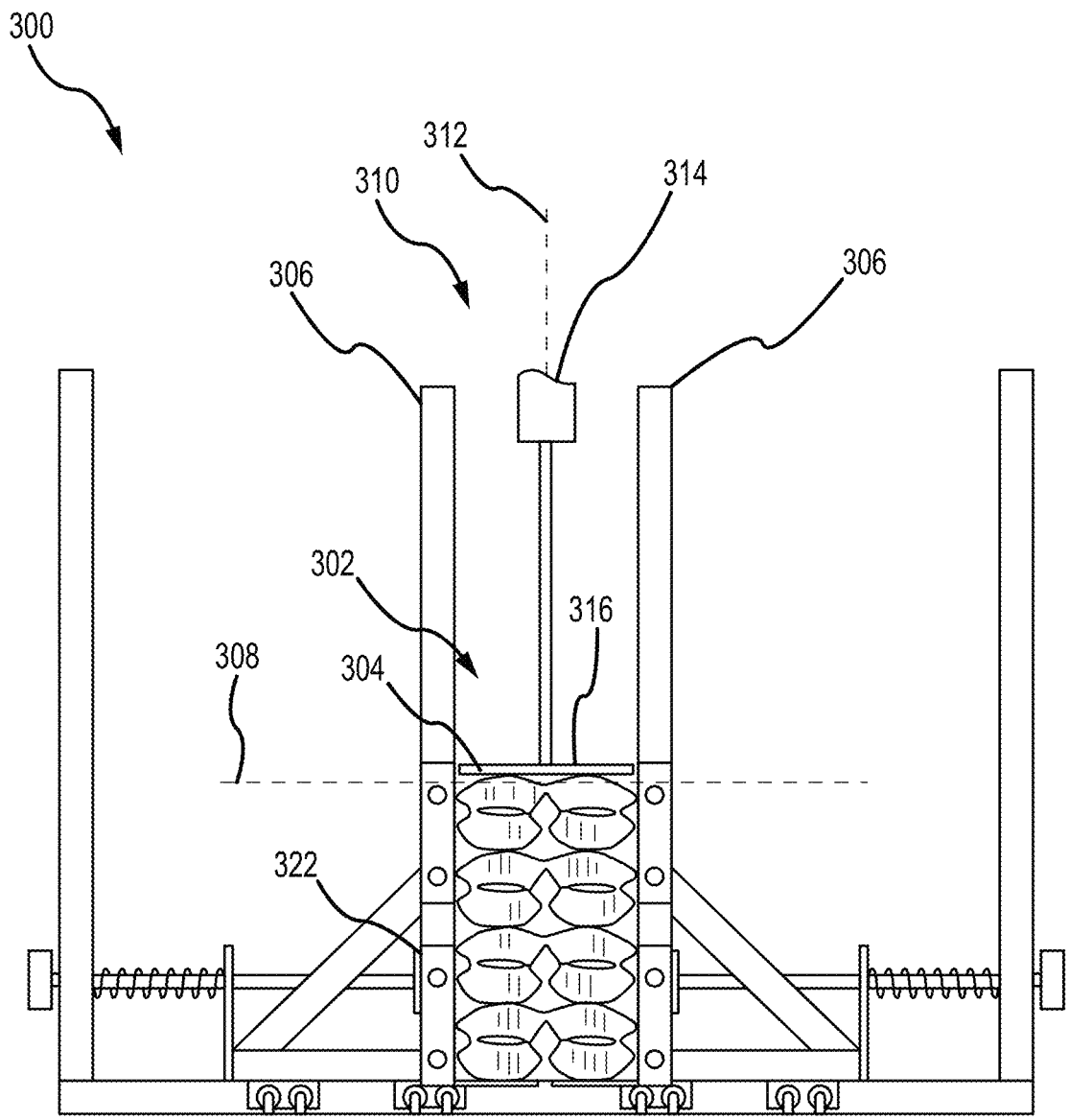
FIG. 3C illustrates a front view of the insulation compression and packing equipment of FIG. 3A in a compressed state.
Figure 3D:
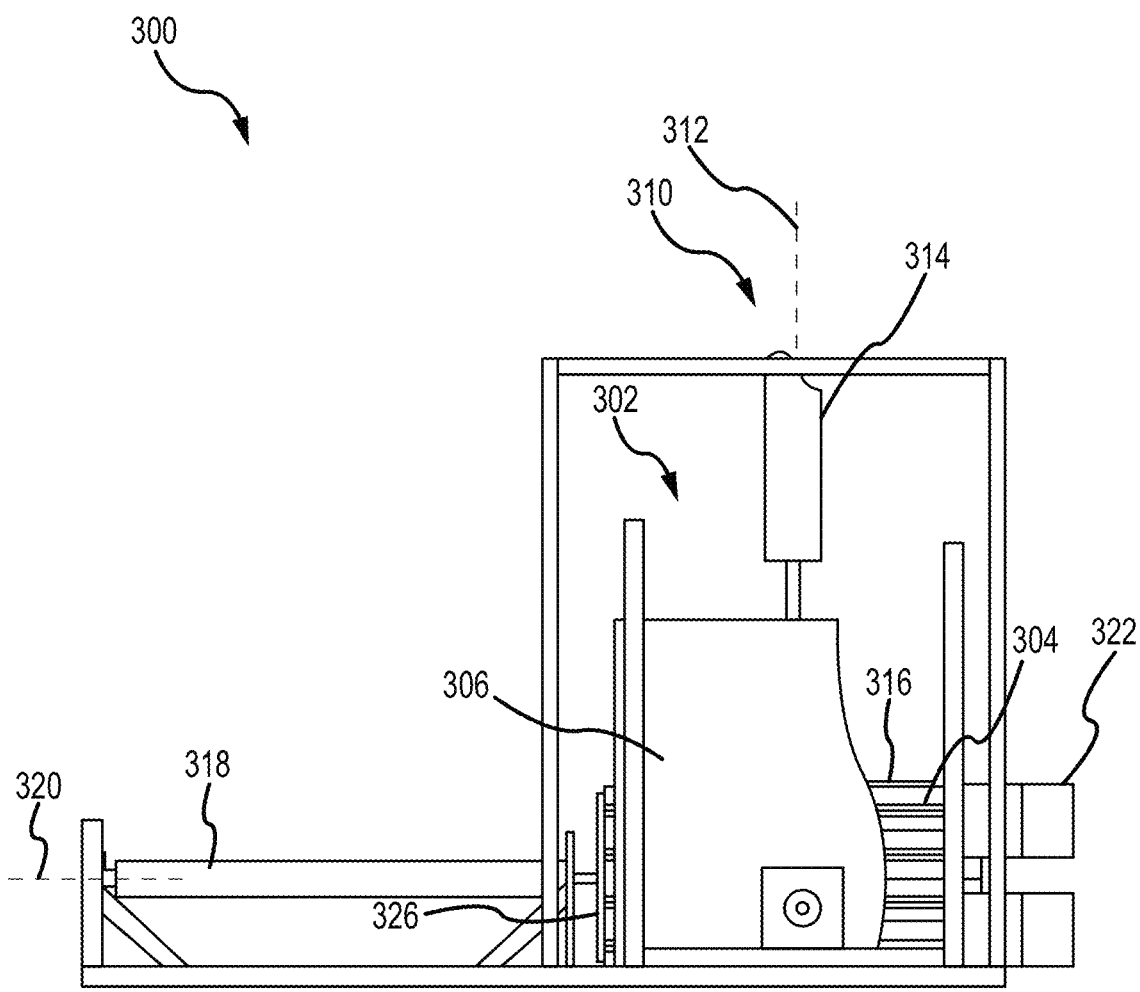
FIG. 3D illustrates a side view of the insulation compression and packing equipment of FIG. 3A in a compressed state.
Figure 3E:
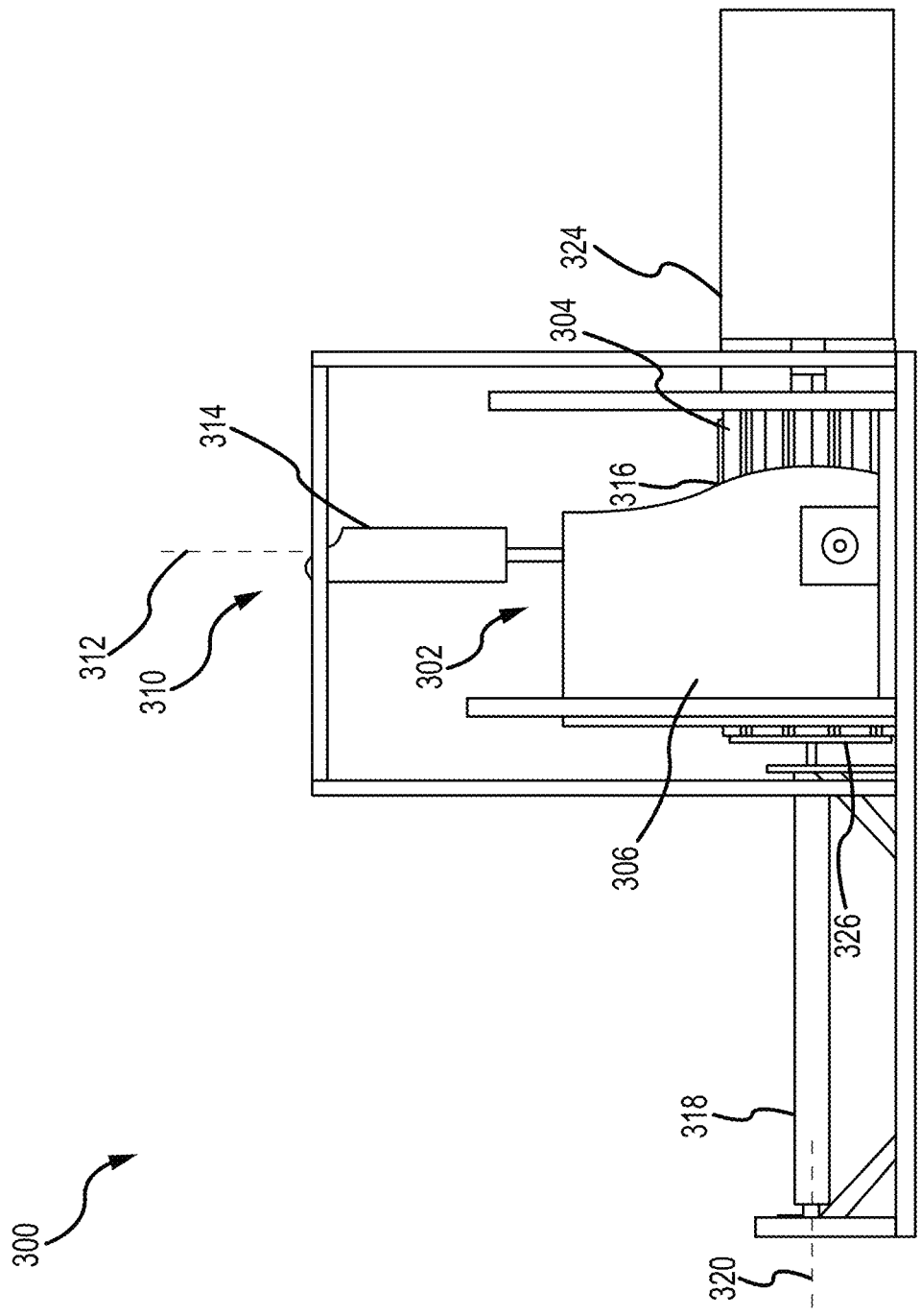
FIG. 3E illustrates a side view of the insulation compression and packing equipment of FIG. 3A with an empty storage container.
Figure 3F:
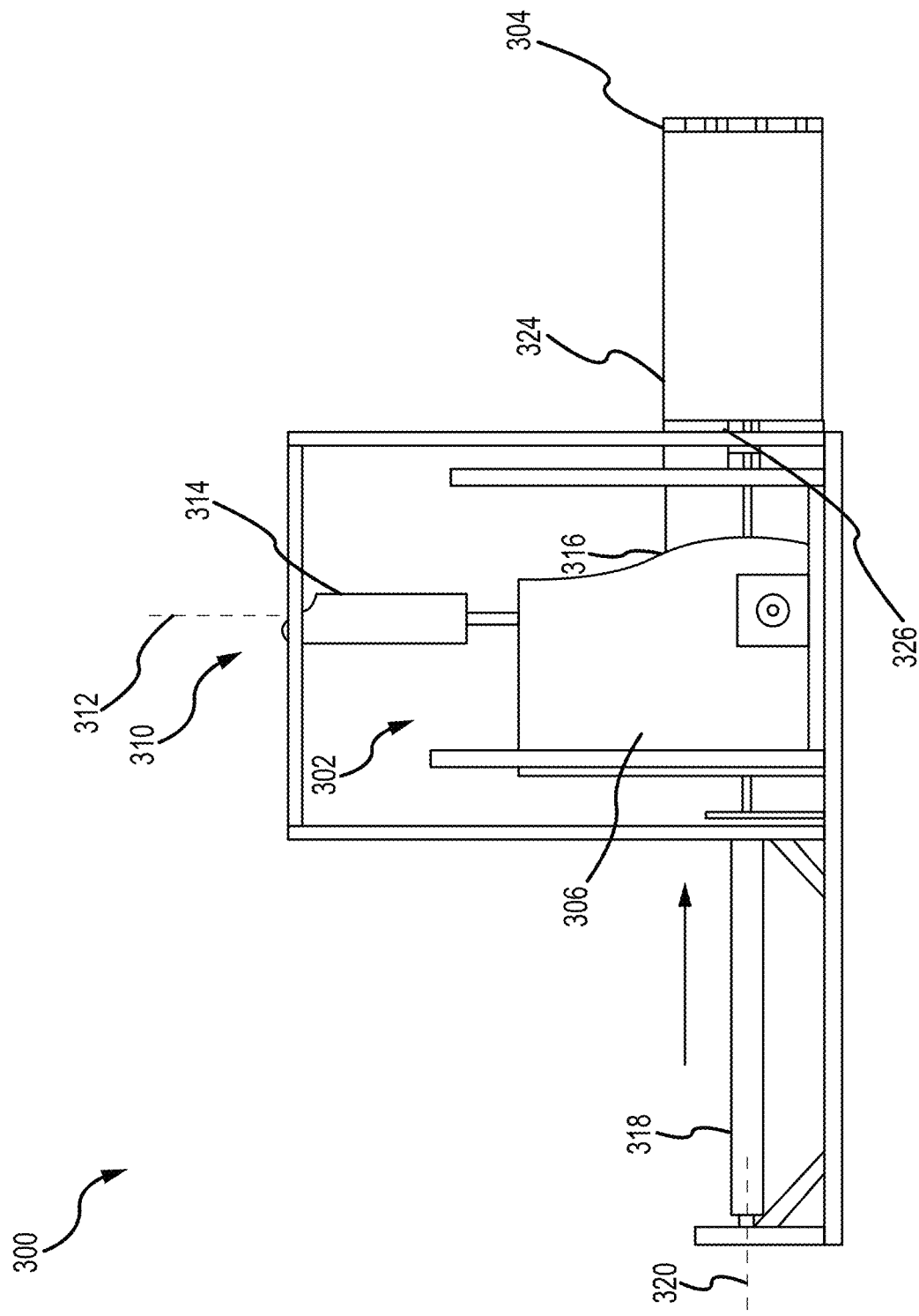
FIG. 3F illustrates a side view of the insulation compression and packing equipment of FIG. 3A with a filled storage container.

The device 300 may also include a compression member 310 that is configured to be positioned near and/or beyond an end of the stacking bay 302. The compression member 310 may be movable along an axis 312 that is substantially orthogonal to the axis 308. For example, in embodiments in which the opposing walls 306 are side walls that move horizontally relative to one another, the compression member 310 may be positioned above and/or near a top of the stacking bay 302 and may be configured to move up and down relative to the stacking bay 302. As illustrated, the compression member 310 includes a ram 314 that is moveable along axis 312. Ram 314 may be moved using a linear actuator, similar to those described above. The ram 314 may be drawn away from the stacking bay 302 to allow a maximum number of pieces of insulation 304 to be stacked and/or otherwise arranged in the stacking bay 302 as best illustrated in FIG. 3A. Once the insulation 304 is arranged within the stacking bay 302 (with the through cuts of each piece of insulation 304 substantially aligned with the axis 312), the ram 314 may be pushed toward the interior of the stacking bay 302 and the pieces of insulation 304. The ram 314 may include a platform 316 that contacts a first end of a distal-most piece of insulation 304 to apply compressive pressure to the stack of insulation, which causes the insulation 304 to compress along axis 312 (and expand along axis 308) until the pieces of insulation 304 have a generally figure-8 shaped cross-section as shown in FIG. 3C.

In some embodiments, the rate of compressive movement of the ram 314 may be directly tied to the movement of the opposing walls 306. For example, the faster the ram 314 moves to compress the insulation 304, the faster the expansion of the distance between opposing walls 306 to accommodate the increasing dimension of the insulation 304 along the axis 308. In embodiments with passive expansion mechanisms (such as spring biased mechanisms), the rate of movement of the opposing walls 306 is automatically driven by the movement of the ram 314, as the expansion of the insulation along axis 308 caused by the compression along axis 312 causes portions of the insulation proximate the first cut and the third cut to press against the opposing walls 306 to increase the distance between the opposing walls 306. In embodiments with active expansion mechanisms, the linear actuators of the opposing walls 306 may be synchronized to expand at a desired rate relative to the compression rate of ram 314. In some embodiments, the rate of expansion of the opposing walls 306 may match a rate of movement of the ram 314, while in other embodiments the rate of expansion of the opposing walls 306 may be different than a rate of movement of the ram 314.

Once the insulation 304 has been compressed along axis 312 by the ram 314 and the opposing walls 306 have expanded to accommodate the increased size of the insulation along axis 308, the insulation 304 may be packaged for storage and/or shipment. To move the compressed insulation from the stacking bay 302 and into a storage container, a packing member 318 may be used. Packing member 318 may be similar to ram 314 and may be configured to be movable along an axis 320 (such as by using a linear actuator) that is substantially orthogonal to both axis 308 and axis 312. The packing member 318 may include a platform 326 that pushes against ends of the compressed insulation 304 to force the compressed insulation 304 along the axis 320 and through an opening of the device 300.

On the exterior side of the opening of the device 300, a container interface 322 having an attachment point for a storage container 324. For example, the container interface 322 may include one or more prongs or frame members that a storage container 324 may be positioned about. In some embodiments, the attachment points may include one or more securement mechanisms, such as clamps, that may help maintain the storage container 324 on the container interface 322 while the compressed insulation 306 is inserted within. In some embodiments, the container interface 322 may be a bag snout that allows a bag and/or sleeve (storage container 324) to be affixed to the attachment point with the bag and/or sleeve in an open configuration that allows the bag and/or sleeve to receive the compressed pieces of insulation 306. In other embodiments, the storage container 324 may be a different structure, such as a box or bin. The container interface 322 allows any such storage container 324 to be coupled with the device 300 while the compressed insulation 306 is forced through the opening of the device 300 and into the storage container 324 by the packing member 318. In some embodiments, the attachment point may be adjustable so as to accommodate different sizes of storage containers 324. For example, the prongs and/or frame members may be moved and locked into a desired position to be used with storage containers 324 of various sizes.

In operation, insulation 304, which may be similar to insulation 100, may be stacked and/or otherwise arranged within the stacking bay 302 such that the opposing walls 306 contact edges of the insulation 304 near the first cut and the third cut, with the through cut of each piece of insulation 304 being generally aligned with the axis 312 of movement of the compression member 310. The compression member 310 may be moved toward the insulation 304 until the insulation 304 starts to compress along the axis 312. As the insulation 304 compresses along the axis 312, one or both of the opposing walls 306 move to increase the distance between the opposing walls 306 to accommodate the increasing size of the insulation 304 along the axis 308. The opposing walls 306 move at a rate that matches the expansion of the insulation 304 along the axis 308 such that the opposing walls 306 stay in contact with the sides of the insulation 304, which helps ensure that the insulation 304 does not rotate and/or otherwise change orientation as the insulation 304 is being compressed. In this manner, the insulation 304 is compressed into a generally figure-8 shaped cross-section. After being compressed, the insulation 306 may be forced into one or more storage containers 324 using packing member 318, which applies a force to a distal end of the insulation 306 along axis 320 to move the compressed insulation. Additionally or alternatively, a live bottom plate (i.e., a moving conveyor) can be used to convey the compressed material via frictional force into one or more storage containers by applying force along a desired axis of movement. Such designs may allow the material to be stacked on an opposite side of the bag snout area, which may be better ergonomically for the operator.

While described and shown with the compression member 314 being oriented for movement in a vertical direction and the opposing walls 306 and packing member 318 being oriented for movement in horizontal directions, it will be appreciated that device 300 may be oriented in any direction. For example, the compression member 314 may be configured to move in a horizontal direction toward a fixed wall or barrier to apply force to the insulation 306 that is positioned between the compression member 314 and the fixed wall. In such embodiments, either the opposing walls 306 or the packing member 318 may be movable in a vertical direction, while the other is movable in a horizontal direction that is orthogonal to the movement of the compression member 314.

FIG. 4 is a flowchart illustrating a process 400 for compressing and packing pipe insulation. Process 400 may be performed using insulation packaging equipment, such as device 300. Process 400 may begin at block 402 by inserting a number of pieces of pipe insulation into a stacking bay of an insulation compression device. Pipe insulation (or other cylindrical and compressible objects) may be similar to insulation 100. For example, each of the pieces of pipe insulation may include a length extending along a longitudinal axis, a thickness, a through cut extending entirely through the thickness along an entirety of the length, and a first cut, a second cut, and a third cut formed through a portion of the thickness and spaced at approximately 90 degree increments about the longitudinal axis relative to the through cut. The second cut may be spaced approximately 180 degrees apart from the through cut about the longitudinal axis and is formed through an interior surface of the respective piece of pipe insulation. The first cut and the third cut may be formed on opposite sides of the respective piece of pipe insulation and are spaced approximately 90 degrees apart from the through cut about the longitudinal axis. The first cut and the third cut may be formed through an exterior surface of the respective piece of pipe insulation. The pieces of pipe insulation may be arranged within the stacking bay such that the through cut is substantially aligned with the first axis. This ensures the that insulation pieces can be compressed in a uniform manner.

At block 404, a compression member may be moved along a first axis into an interior of the stacking bay to compress the pieces of pipe insulation. At least one of two opposing walls of the stacking bay may be moved along a second axis to increase a lateral distance between the two opposing walls while the compression member is moved to accommodate an increasing size of the plurality of pieces of pipe insulation along the second axis at block 406. The first axis may be generally orthogonal to the second axis. When compressed, each piece of pipe insulation has a generally figure 8 shaped cross section, such as illustrated in FIG. 1C.

Once the insulation is compressed, a force may be applied along a third axis (such as by a packing member) to move compressed pipe insulation into a storage container at block 408. The third axis may be substantially orthogonal to both the first axis and the second axis. The storage container may be affixed to an attachment point of the insulation compression device. In some embodiments, the process 400 may include adjusting a size of the attachment point to accommodate a size of the storage container. Once inserted within the storage container, the compressed insulation pieces may form generally rectangular packages (such as shown in FIG. 2) that allow the insulation to be stacked and/or arranged in an efficient manner for storage and/or shipment.

The methods, systems, and devices discussed above are examples. Some embodiments were described as processes depicted as flow diagrams or block diagrams.

Although each may describe the operations as a sequential process, many of the operations can be performed in parallel or concurrently. In addition, the order of the operations may be rearranged. A process may have additional steps not included in the figure.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

What is claimed is:

1. A system for compressing and packing insulation, comprising:
   a compression member that is movable along a first axis to compress a plurality of pieces of insulation;
   a stacking bay comprising two opposing walls that are spaced apart from one another to form a volume between the two opposing walls, wherein at least one of the two opposing walls is movable relative to the other of the two opposing walls along a second axis to adjust a lateral distance between the two opposing walls to accommodate an increasing size of the plurality of pieces of insulation along the second axis while being compressed by the compression member, wherein the first axis is orthogonal to the second axis; and
   a packing member that is configured to apply a force along a third axis to the plurality of pieces of insulation after being compressed, the third axis being orthogonal to the first axis and the second axis, wherein:
   the compression member is configured to be moved within the volume formed between the two opposing walls as the plurality of pieces of insulation are compressed.

2. The system for compressing and packing insulation of claim 1, further comprising:
   a container interface having an attachment point that is configured to couple with a storage container, wherein the packing member is configured to force the plurality of pieces of insulation through the container interface and into the storage container.

3. The system for compressing and packing insulation of claim 2, wherein:
   the attachment point is adjustable so as to accommodate different sizes of storage containers.

4. The system for compressing and packing insulation of claim 2, wherein:
   the storage container comprises one or both of a sleeve or bag.

5. The system for compressing and packing insulation of claim 1, wherein:
   the at least one of the two opposing walls is spring biased toward the other of the two opposing walls with a spring force that allows the lateral distance to increase as compressed insulation expands along the second axis.

6. The system for compressing and packing insulation of claim 1, wherein:
   the at least one of the two opposing walls is configured to move along the second axis at a predetermined rate relative to movement of the compression member.

7. The system for compressing and packing insulation of claim 1, wherein:
   both of the two opposing walls are movable along the second axis.

8. The system for compressing and packing insulation of claim 1, further comprising:
   a linear actuator that is configured to move the at least one of the two opposing walls along the second axis.

9. The system for compressing and packing insulation of claim 8, wherein:
   the linear actuator comprises at least one actuator selected from the group consisting of a screw actuator, a wheel and axle actuator, and a cam actuator.

10. The system for compressing and packing insulation of claim 8, wherein:
    the linear actuator comprises at least of a hydraulic actuator, a mechanical actuator, a pneumatic actuator, or an electric actuator.

11. The system for compressing and packing insulation of claim 8, wherein:
    a rate of speed of the linear actuator is synchronized to increase the lateral distance between the two opposing walls at a desired rate relative to a speed of the compression member.

12. The system for compressing and packing insulation of claim 1, further comprising:
    a number of stops that set a maximum expansion distance of the two opposing walls.

13. A method for compressing and packing insulation, comprising:
    inserting a plurality of pieces of insulation into a stacking bay of an insulation compression device, the stacking bay comprising two opposing walls that are spaced apart from one another to form a volume between the two opposing walls;
    moving a compression member, configured to be moved within the volume formed between the two opposing walls, along a first axis into an interior of the stacking bay to compress the plurality of pieces of insulation; and
    moving at least one of the two opposing walls of the stacking bay along a second axis to increase a lateral distance between the two opposing walls while the compression member is moved to accommodate an increasing size of the plurality of pieces of insulation along the second axis, wherein the first axis is orthogonal to the second axis.

14. The method for compressing and packing insulation of claim 13, wherein:
    each of the plurality of pieces of insulation comprises:
    a length extending along a longitudinal axis;
    a thickness;

a through cut extending entirely through the thickness along an entirety of the length;

a first cut, a second cut, and a third cut formed through a portion of the thickness and spaced at approximately 90 degree increments about the longitudinal axis relative to the through cut; and inserting the plurality of pieces of insulation comprises arranging each of the plurality of pieces of insulation such that the through cut is substantially aligned with the first axis.

15. The method for compressing and packing insulation of claim 14, wherein:

the second cut is spaced approximately 180 degrees apart from the through cut about the longitudinal axis and is formed through an interior surface of the respective piece of insulation;

the first cut and the third cut are formed on opposite sides of the respective piece of insulation and are spaced approximately 90 degrees apart from the through cut about the longitudinal axis; and the first cut and the third cut are formed through an exterior surface of the respective piece of insulation.

16. The method for compressing and packing insulation of claim 13, wherein:

when compressed the each of the plurality of pieces of insulation comprises a generally figure 8 shaped cross section.

17. The method for compressing and packing pipe insulation of claim 13, further comprising:

applying a force along a third axis to move compressed insulation into a storage container, the third axis being substantially orthogonal to the first axis and the second axis.

18. The method for compressing and packing insulation of claim 17, further comprising:

affixing the storage container to an attachment point of the insulation compression device.

19. The method for compressing and packing insulation of claim 18, further comprising:

adjusting a size of the attachment point to accommodate a size of the storage container.

* * * * *